(12) United States Patent
Pallini et al.

(10) Patent No.: US 11,306,807 B2
(45) Date of Patent: Apr. 19, 2022

(54) MAINTENANCE FREE EXTENDED LIFE CAM FOLLOWER FOR A NECKER MACHINE

(71) Applicant: Roller Bearing Company of America, Inc., Oxford, CT (US)

(72) Inventors: Robert Pallini, Cheltenham, PA (US); Michael Coppola, Prospect, CT (US); Bradley Smith, Glastonbury, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 17/342,598

(22) Filed: Jun. 9, 2021

(65) Prior Publication Data
US 2021/0293318 A1   Sep. 23, 2021

Related U.S. Application Data

(62) Division of application No. 16/684,827, filed on Nov. 15, 2019.

(Continued)

(51) Int. Cl.
*F16H 53/06* (2006.01)
*F16C 19/18* (2006.01)

(52) U.S. Cl.
CPC .............. *F16H 53/06* (2013.01); *F16C 19/18* (2013.01); *F16C 2360/18* (2013.01)

(58) Field of Classification Search
CPC .......... F16H 53/06; F16H 53/08; F16C 19/18; F16C 19/28; F16C 19/38; F16C 19/48;
(Continued)

(56) References Cited

U.S. PATENT DOCUMENTS 2,686,698 A * 8/1954 Moore, Jr. .............. F16C 19/54
384/480
3,266,856 A   8/1966 Steinert et al.
(Continued)

FOREIGN PATENT DOCUMENTS

| DE | 19529042 A1 | 2/2017 |
| EP | 3211257 A1 | 8/2017 |
| JP | 06032809 U | 4/1994 |

OTHER PUBLICATIONS

Extended European Search Report issued in corresponding EP Application No. 19209491.0, dated Jun. 17, 2020, pp. 1-10.
(Continued)

*Primary Examiner* — Richard W Ridley
*Assistant Examiner* — Brian J McGovern
(74) *Attorney, Agent, or Firm* — Murtha Cullina LLP

(57) ABSTRACT

A cam follower for a ram of a metal can necker machine is provided. The cam follower has an outer ring and an inner ring coaxially disposed in the outer ring. A plurality of rolling elements is disposed in an annular cavity between the outer ring and the inner ring. The plurality of rolling elements is disposed between a first seal and a second seal. A shaft is received in a bore in the inner ring and is fixed relative thereto about the shaft axis. The outer ring is received in a tire. The tire has a thickness and a crown radius. The composition of the tire includes a metallic material, a plastic material, a non-metallic material, and combinations thereof.

7 Claims, 15 Drawing Sheets

Related U.S. Application Data

(60) Provisional application No. 62/824,548, filed on Mar. 27, 2019, provisional application No. 62/823,165, filed on Mar. 25, 2019, provisional application No. 62/768,323, filed on Nov. 16, 2018.

(58) Field of Classification Search
CPC ........ F16C 19/492; F16C 19/54; F16C 35/04; F16C 35/042; F16C 35/06; F16C 35/061; F16C 35/063; F16C 35/067
See application file for complete search history.

(56) References Cited

U.S. PATENT DOCUMENTS

| | | | |
|---|---|---|---|
| 3,889,983 A | 6/1975 | Freize et al. | |
| 4,138,168 A | 2/1979 | Herlitzek | |
| 4,817,995 A | 4/1989 | Deubler et al. | |
| 5,531,137 A | 7/1996 | Guilford | |
| 6,191,924 B1 * | 2/2001 | Koester | G11B 5/4813 360/250 |
| 6,267,510 B1 | 7/2001 | Herber et al. | |
| 6,280,097 B1 | 8/2001 | Mues et al. | |
| 6,449,130 B1 * | 9/2002 | Koyama | G11B 5/4813 360/264.4 |
| 6,603,640 B1 * | 8/2003 | Prater | F16C 19/54 360/264.4 |
| 6,692,155 B2 * | 2/2004 | Shimomura | C23C 26/00 384/464 |
| 7,234,873 B2 | 6/2007 | Kato et al. | |
| 9,482,332 B2 | 11/2016 | Shibutani et al. | |
| 10,274,013 B2 | 4/2019 | Pallini et al. | |
| 10,861,488 B2 * | 12/2020 | Hayasaka | G11B 5/4813 |
| 2002/0092371 A1 * | 7/2002 | Nakakado | F16H 53/06 74/57 |
| 2002/0167762 A1 * | 11/2002 | Kan | G11B 5/5521 360/265.2 |
| 2008/0011119 A1 | 1/2008 | Bartosch | |
| 2013/0118299 A1 * | 5/2013 | Pallini | F16H 53/06 74/569 |
| 2014/0369636 A1 * | 12/2014 | Tagle | F16C 33/6651 384/470 |
| 2015/0101387 A1 | 4/2015 | Pallini | |
| 2018/0149257 A1 | 5/2018 | Prescavage et al. | |
| 2018/0355913 A1 | 12/2018 | Pallini et al. | |
| 2019/0219146 A1 * | 7/2019 | Malychok | F16C 33/7856 |
| 2019/0264738 A1 | 8/2019 | Malychok et al. | |
| 2020/0176025 A1 * | 6/2020 | Tsuchiya | F16C 19/06 |

OTHER PUBLICATIONS

"Rolling-element bearing." Wikipedia page, dated by Wayback Machine to Nov. 22, 2017, url: <https://web.archive.org/web/20171122095249/https://en.wikipedia.org/wiki/Rolling-element_bearing>.

Interference fit, Wikipedia Page, dated by Wayback Machine to Dec. 18, 2017, url: <https://web.archive.org/web/20171218194034/https://en.wikipedia.org/wiki/Interface_fit>.

Engineering fit, Wikipedia Page, dated by Wayback Machine to Apr. 19, 2017, url: <https://web.archive.org/web/20170419210428/https://en.wikipedia.org/wiki/Engineering_fit>.

Extended European Search Report issued in corresponding EP Application No. 21167431.2, dated Oct. 8, 2021, pp. 1-9.

* cited by examiner

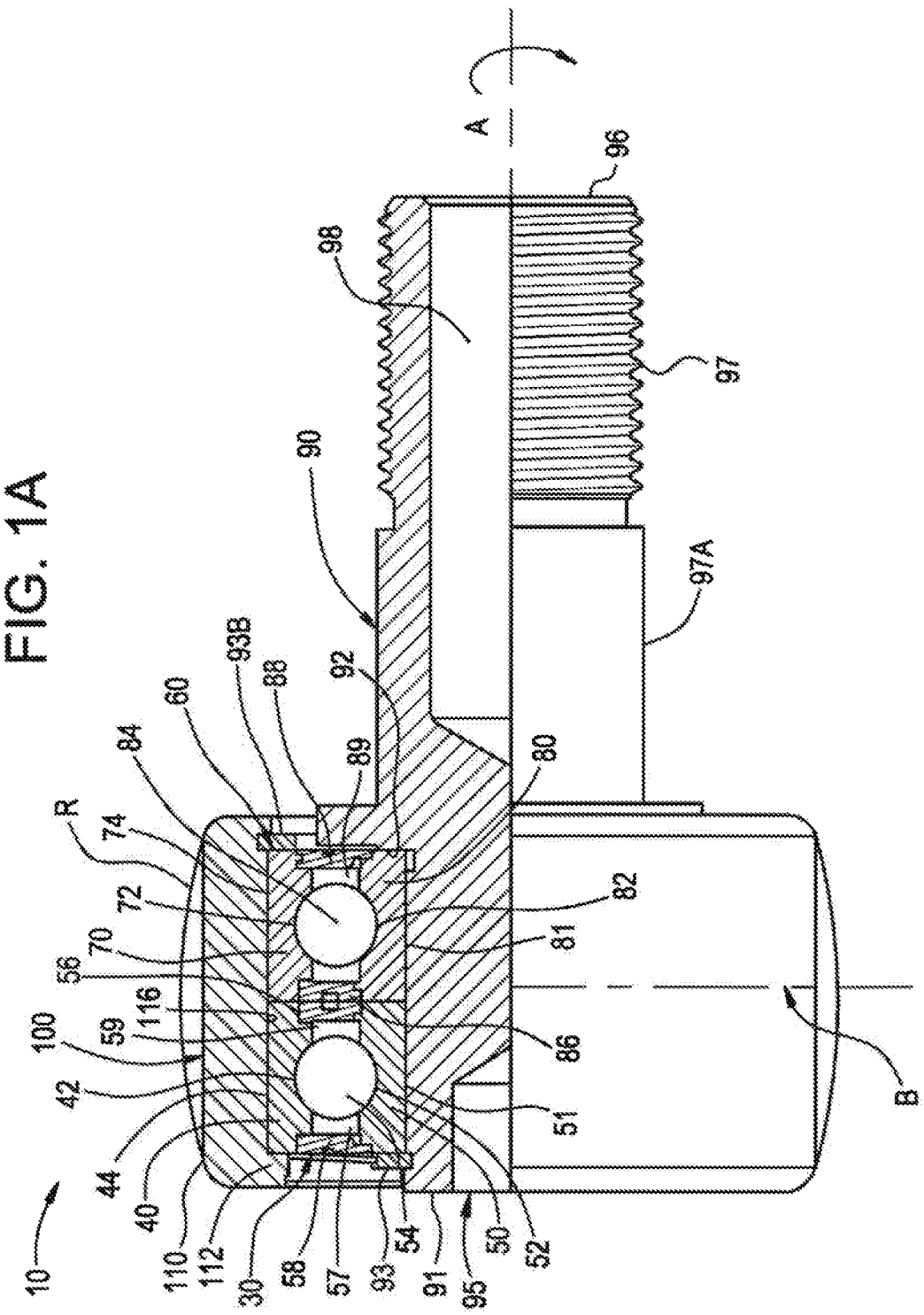

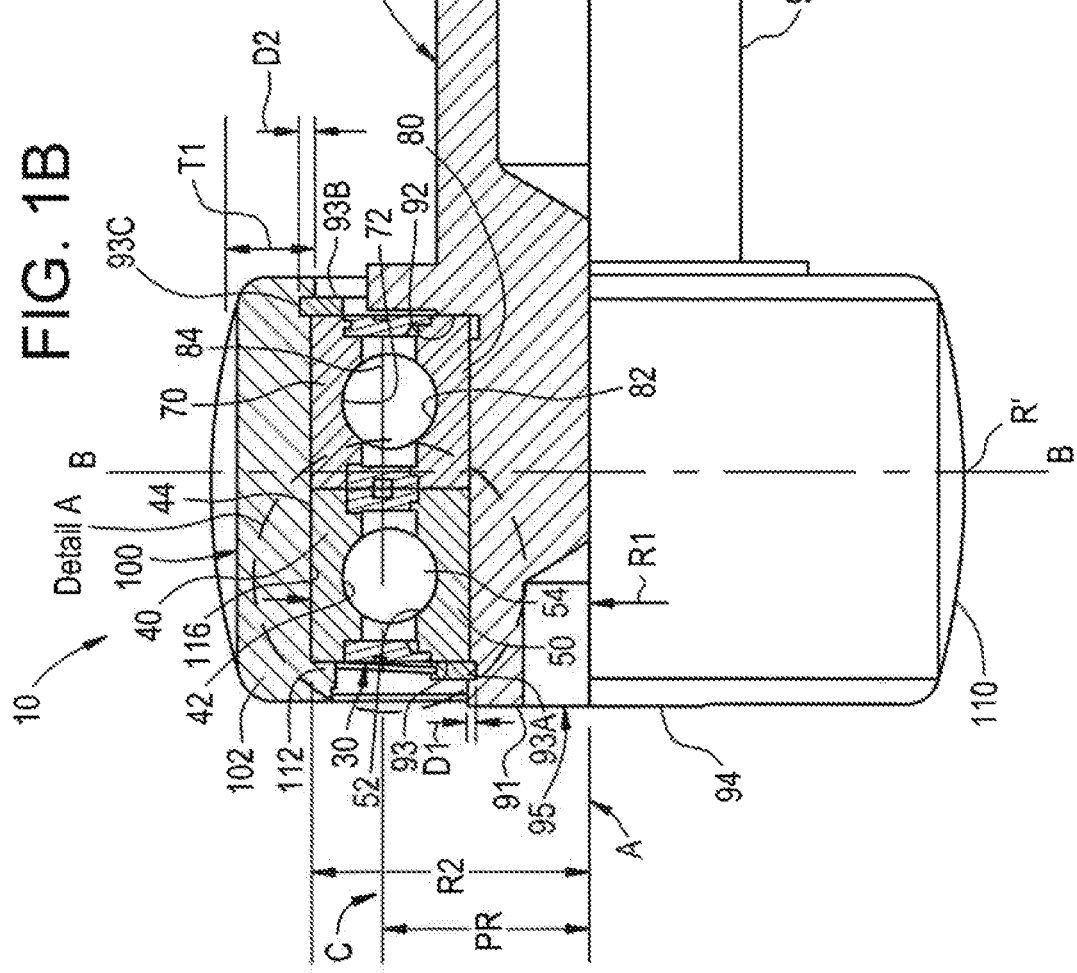

FIG. 7

Duty Cycle Life Results

| Roller Number | Ball Bearing Pair | Un-Factored Life (hr) | Factored Life Vacuum De-gased Steel (hr) | Fully Factored Life-Lube and Steel (hr) |
|---|---|---|---|---|
| 1 | 6003 | 1,510 | 3,322 | 8,640 |
| 1 | 6202 | 3,792 | 8,342 | 21,787 |
| 2 | 6003 | 4,095 | 9,009 | 23,600 |
| 2 | 6202 | 10,489 | 23,076 | 60,482 |

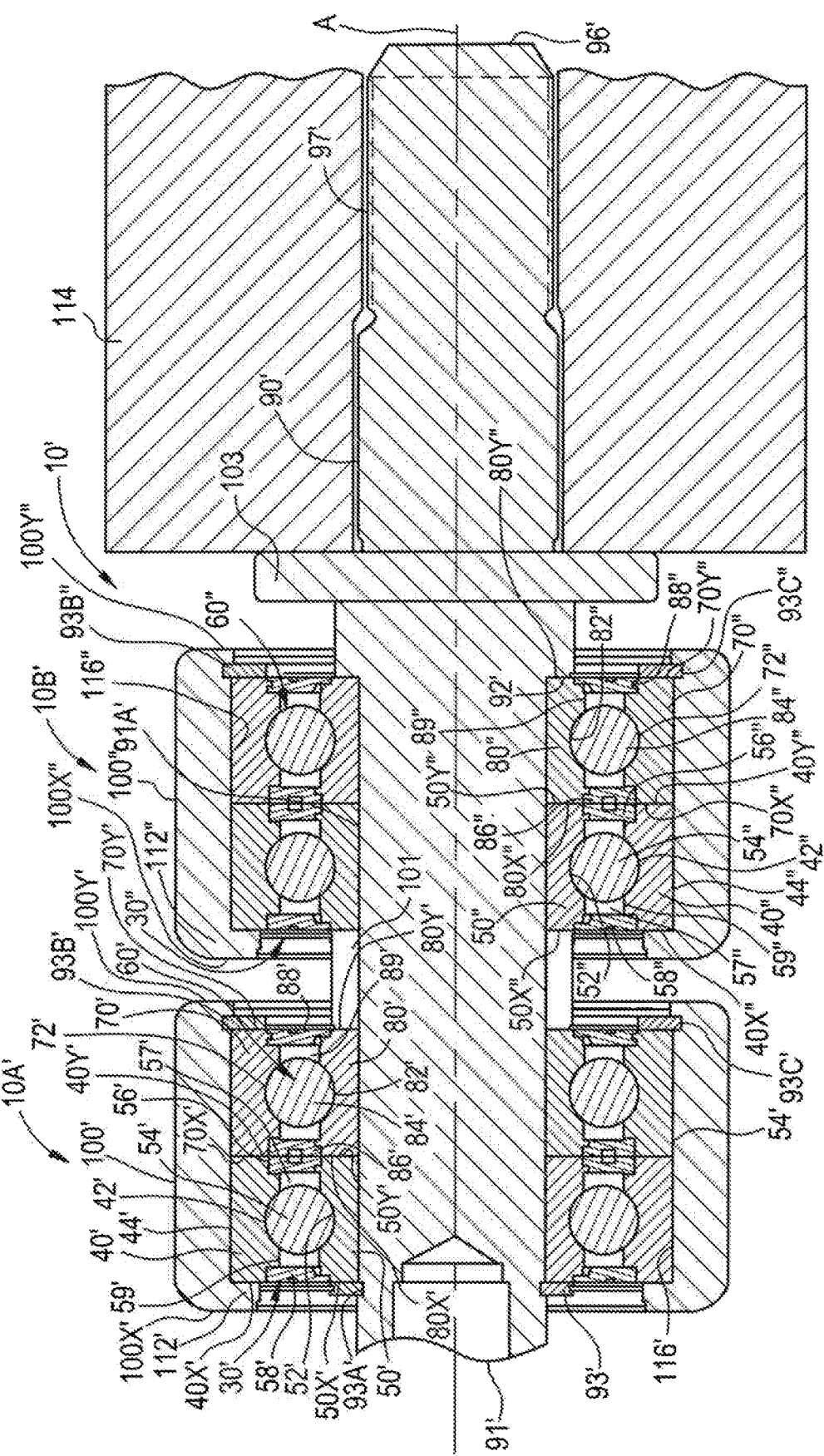

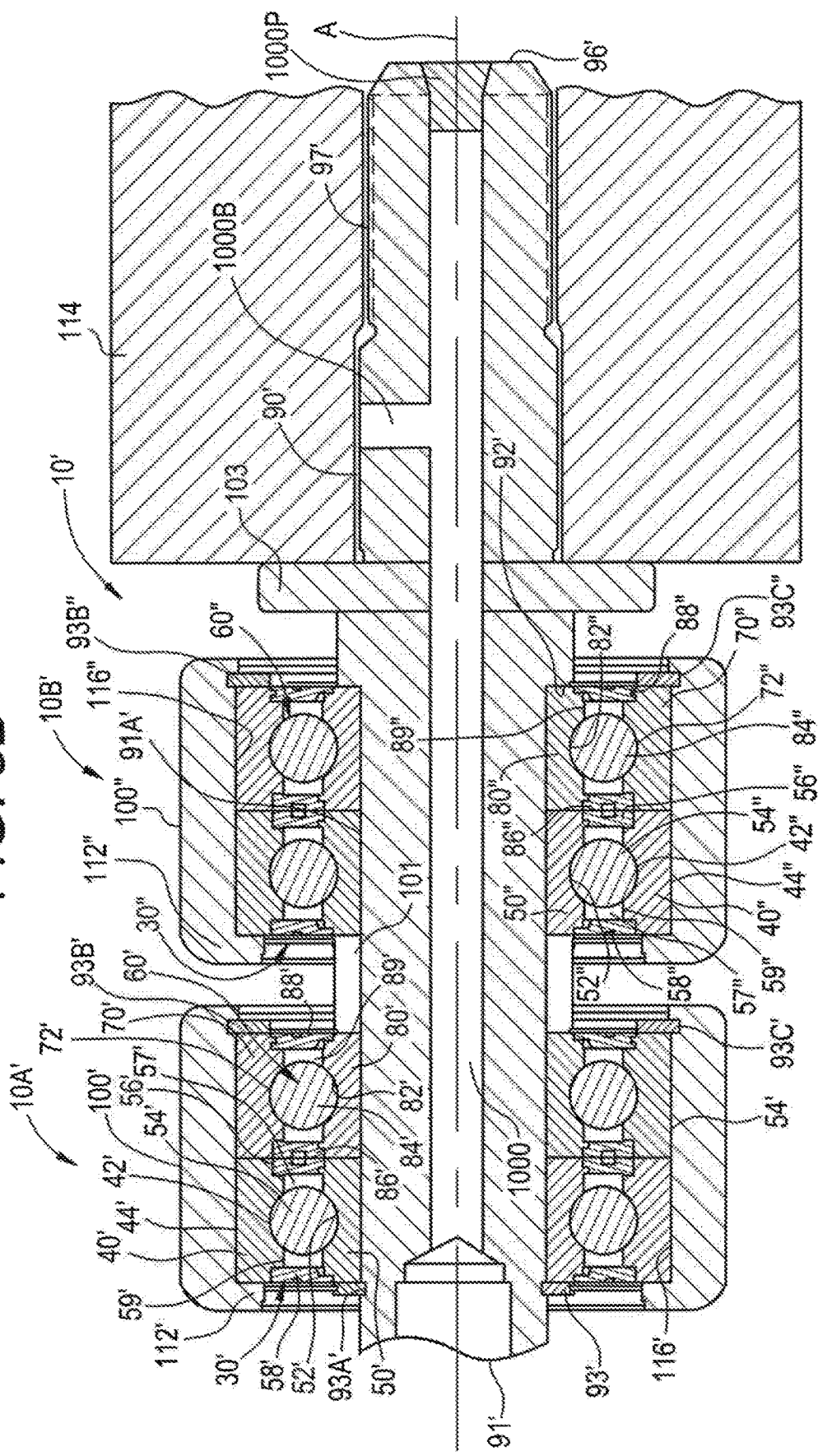

Inner Inboard Duty Cycle

Outer Inboard Duty Cycle

Outer Outboard Duty Cycle

Inner Outboard Duty Cycle

FIG. 12

| Roller | Roller Speed (rpm) | Individual Ball Bearing Life (hrs) | Roller Assembly Life (hrs) |
|---|---|---|---|
| Outer Inboard 10D' | 5110 | 52,610 | 28,193 |
| Outer Outboard 10C' | 5110 | 294,860 | 138,010 |
| Inner Inboard 10B' | 3725 | 464,150 | 248,730 |
| Inner Outboard 10A' | 3725 | 2,072,500 | 1,110,600 |

MAINTENANCE FREE EXTENDED LIFE CAM FOLLOWER FOR A NECKER MACHINE

CROSS REFERENCE TO RELATED APPLICATION

This application is a divisional application of and claims priority to commonly owned and co-pending U.S. application Ser. No. 16/684,827, filed on Nov. 15, 2019, which is a non-provisional application of and claims priority to U.S. Provisional Patent Application No. 62/824,548 filed on Mar. 27, 2019, U.S. Provisional Patent Application No. 62/823,165 filed on Mar. 25, 2019, and U.S. Provisional Patent Application No. 62/768,323 filed on Nov. 16, 2018, the contents of each of which are incorporated herein by reference in their entirety.

FIELD OF THE INVENTION

The present invention is generally directed to a maintenance free cam follower for a metal can production necker. More specifically, the present invention is directed to novel maintenance free long service life configurations including greased and sealed for life ball bearings pressed into wheels (e.g., tires) in first and second cam follower segments and mounted on studs.

BACKGROUND OF THE INVENTION

Metal cans are often produced as two-piece cans which comprise a cylindrical can body with an integral bottom wall and a can top. The can is typically made from aluminum. Typically, curved sections are formed at the bottom and top of the can to increase its structural integrity.

The beverage can fabrication industry utilizes a variety of aluminum bending and shaping machines that have very demanding requirements. A typical beverage can fabrication plant runs 24 hours per day and can produce upwards to 3000 cans per minute across 3 to 4 several fabrication lines. A can making machine, sometimes referred to as a necker, forms the curved sections of the can by progressively squeezing, i.e. necking, the can body between opposing ram bodies which squeeze the can. The ram typically includes one or more cam followers extending therefrom. The cam followers ride on a cam that is mounted on a cylinder. As the ram rotates about the cylinder, the cam follower rides on the cam, which is configured to move the ram back and forth.

One of the operations in the line is called the necking station. These machines consist of rotating high-speed turrets that feed the can in and gradually form a neck and a flange at the top of the can that will eventually mate with the lid after filling. Stud mounted cam followers are a vital part of the mechanism in the necking station allowing the cans to enter, get worked, and exit.

Automated greasing systems are required to keep the cam followers lubricated and able to provide sufficient service life. Machine design complexity and maintenance is greatly reduced if these cam followers are designed to be maintenance free.

Therefore, there is a need for improved maintenance free cam followers that are creep free and that also include optimized ball bearing internal clearance reduction for maximum service life.

SUMMARY OF THE INVENTION

The present invention resides in one aspect in a cam follower that includes an outer ring that has an outer ring bearing surface and an exterior surface; and an inner ring that is coaxially disposed in the outer ring. The inner ring has an inner ring bearing surface and a bore extending therethrough. A group of rolling elements is disposed in an annular cavity formed between the outer ring bearing surface and the inner ring bearing surface. The group of rolling elements is in rolling engagement with the outer ring bearing surface and the inner ring bearing surface such that the outer ring is rotatable relative to the inner ring about a shaft axis. The group of rolling elements have a pitch radius defined by a distance between a longitudinal axis of the shaft and a rolling element axis. A shaft is received in the bore in the inner ring so that the shaft is fixed relative to the inner ring about the longitudinal axis of the shaft. The shaft has a first groove formed therein. The first groove extends radially inward and circumferentially around the shaft. The group of rolling elements are disposed between a first seal and a second seal which seal a lubricant therebetween. The inner ring is axially retained by a first clip that is disposed at a depth in the first groove. The outer ring is received in a tire which has a thickness and a crown radius. The crown radius has an apex. The inner ring and the outer ring are axially centered with respect to the apex. The composition of the tire includes a metallic material, a plastic material, and/or a non-metallic material. The tire has a second groove formed therein, extending radially outward and extending circumferentially therearound. The outer ring is axially retained by a second clip that is disposed at the depth in the second groove.

In one embodiment, a ratio of the depth to the tire thickness is between 0.17 and 0.19.

In one embodiment, a ratio of the tire thickness to the pitch radius is between 0.18 and 0.19.

In one embodiment, a first distance is defined between an exterior surface of the outer ring and the longitudinal axis of the shaft and a second distance is defined between the longitudinal axis of the shaft and an interior surface of the tire, wherein a ratio of the first distance to the second distance is between 1.000 and 1.015.

In one embodiment, the group of rolling elements is a group of spherical balls.

In one embodiment, the cam follower has a duty cycle and a bearing load capacity being selected based on the duty cycle.

In one embodiment, the shaft includes a hollow portion.

There is also disclosed herein a cam follower that includes a shaft that extends from a first axial end to a second axial end. The shaft has a first groove proximate to the first axial end and a shoulder formed in the shaft between the first groove and the second axial end. A first clip is radially engaged in the first groove. The cam follower includes a tire that has an interior area and a flange that extends extending radially inward from the tire at an axial end of the tire. A second groove extends radially outward at another axial end of the tire. The cam follower includes a first ball bearing and a second ball bearing. The first ball bearing has a first group of spherical balls disposed between a first inner ring and a first outer ring. The second ball bearing has a second group of spherical balls disposed between a second inner ring and a second outer ring. The first outer ring and the second outer ring extend partially into the interior area of the tire. The first inner ring axially abuts the second inner ring and the first clip. The second inner ring axially abuts the shoulder and the first inner ring. The first outer ring axially abuts the second outer ring and the flange. The second outer ring axially abuts the first outer ring and a second clip which is engaged in the second groove. The first clip axially retains the first inner ring and the second inner ring on the shaft between the first clip and the shoulder.

In one embodiment, a first seal extends between the first inner ring and the first outer ring; a second seal extends between the first inner ring and the first outer ring; a third seal extends between the second inner ring and the second outer ring; and a fourth seal extends between the second inner ring and the second outer ring, proximate to the first clip. The second seal and the first seal sealing a first lubricant therebetween and the third seal and the fourth seal sealing a second lubricant therebetween.

In one embodiment, the first clip is disposed at the depth in a first groove and a second clip is disposed at the depth in a second groove and the first tire has a thickness and a crown radius that has an apex. The first inner ring and the second inner ring are axially centered with respect to the apex. The composition of the tire includes a metallic material, a plastic material, a non-metallic material, and combinations thereof.

In one embodiment, a ratio of the depth to the tire thickness is between 0.17 and 0.19.

In one embodiment, a ratio of the tire thickness to a pitch radius of the bearing is between 0.18 and 0.19.

In one embodiment, a first distance is defined between an exterior surface of the first outer ring 40 and the longitudinal axis of the shaft and a second distance is defined between the longitudinal axis of the shaft and an interior surface of the tire and a ratio of the first distance to the second distance is between 1.000 and 1.015.

In one embodiment, the shaft includes a hollow portion.

In one embodiment, the cam follower includes a first cam follower segment and a second cam follower segment.

In one embodiment, the first cam follower segment has a first duty cycle and a bearing load capacity being selected based on the first duty cycle.

In one embodiment, the second cam follower segment has a second duty cycle and a bearing load capacity being selected based on the second duty cycle.

There is further disclosed herein a cam follower that includes a shaft that extends from a first axial shaft end to a second axial shaft end. The shaft has a first groove located proximate to the first axial shaft end. The shaft has a shoulder formed in (extending radially outward from) the shaft and located between the first groove and the second axial shaft end. A first clip is radially engaged in the first groove. The cam follower includes two cam follower segments, namely a first cam follower segment and a second cam follower segment. The first cam follower segment includes a first tire that defines a first interior area. The first cam follower segment has a first ball bearing and a second ball bearing, both being partially disposed in the first interior area of the first tire. The second cam follower segment includes a second tire that defines a second interior area. The second cam follower segment has a third ball bearing and a fourth ball bearing, both being partially disposed in the second interior area. The cam follower includes a spacer disposed on the shaft between the second ball bearing and the third ball bearing. The first cam follower segment and the second cam follower segment are axially retained on the shaft by the first clip, the spacer and the shoulder.

In one embodiment, the first tire includes: (i) a first flange extending radially inward from the first tire and located at a first axial tire end of the first tire; (ii) a second groove extending radially outward into the first tire and located at a second axial tire end of the first tire; and (iii) a second clip is engaged in the second groove. The second tire includes: (i) a second flange extending radially inward from the second tire and located at an third axial tire end of the second tire; (ii) a third groove extending radially outward into the second tire and located at a fourth axial tire end of the second tire; and (iii) a third clip engaged in the third groove.

In one embodiment, the first ball bearing has a first inner ring disposed in a first outer ring and has a first group of spherical balls disposed between the first inner ring and the first outer ring. The second ball bearing has a second inner ring disposed in a second outer ring and has a second group of spherical balls disposed between the second inner ring and the second outer ring. The first inner ring axially abuts the second inner ring and the first clip. The first outer ring axially abuts the second outer ring and the first flange. The second outer ring axially abuts the second clip. The third ball bearing has a third inner ring disposed in a third outer ring and has a third group of spherical balls disposed between the third inner ring and the third outer ring. The fourth ball bearing has a fourth inner ring disposed in a fourth outer ring and has a fourth group of spherical balls disposed between the fourth inner ring and the fourth outer ring. The third inner ring axially abuts the fourth inner ring. The fourth inner ring axially abuts the shoulder. The third outer ring axially abuts the second flange and the fourth outer ring. The fourth outer ring axially abuts the third outer ring. The spacer abuts the second inner ring and the third inner ring.

In one embodiment, the first group of spherical balls is disposed between a first seal and a second seal. The first seal and the second seal contain (i.e., seal) a first lubricant therebetween. The second group of spherical balls is disposed between a third seal and a fourth seal. The third seal and the fourth seal contain (i.e., seal) sealing a second lubricant therebetween. The third group of spherical balls is disposed between a fifth seal and a sixth seal. The fifth seal and the sixth seal contain (i.e., seal) a third lubricant therebetween. The fourth group of spherical balls is disposed between a seventh seal and an eighth seal. The seventh seal and the eighth seal contain (i.e., seal) a fourth lubricant therebetween.

In one embodiment, the first seal is fixed to the first outer ring, the third seal is fixed to the second outer ring, the fifth seal is fixed to the third outer ring, and the seventh seal is fixed to the fourth outer ring.

In one embodiment, the second seal is fixed to the first outer ring, the fourth seal is fixed to the second outer ring, the sixth seal is fixed to the third outer ring, and eighth seal is fixed to the fourth inner ring.

In one embodiment, the first inner ring, the second inner ring, the spacer, the third inner ring, and the fourth inner ring define an axial stackup.

DESCRIPTION OF THE DRAWINGS

FIG. 1A is partial cross-sectional view of a cam follower in accordance with one embodiment of the present invention.

FIG. 1B is another partial quarter section view of some of the elements of the cam follower shown in FIG. 1A.

FIG. 1D is a cross-sectional view of the first bearing depicted in Detail A of FIG. 1B, with the internal clearance C1, C2 exaggerated for clarity purposes. FIG. 1D is also representative of the bearings depicted in FIG. 8.

FIG. 7 depicts duty cycle life results for a first and a second cam follower.

FIG. 8A is a partial cross-sectional view of a cam follower in accordance with another embodiment of the present invention.

FIG. 8B is a partial cross-sectional view of a cam follower of FIG. 8A and having a lubrication passage therein.

FIG. 12 depicts duty life cycle results for the aforementioned inner and outer inboard cam followers and the inner and outer outboard cam followers.

DETAILED DESCRIPTION OF THE INVENTION

Figure 1C:
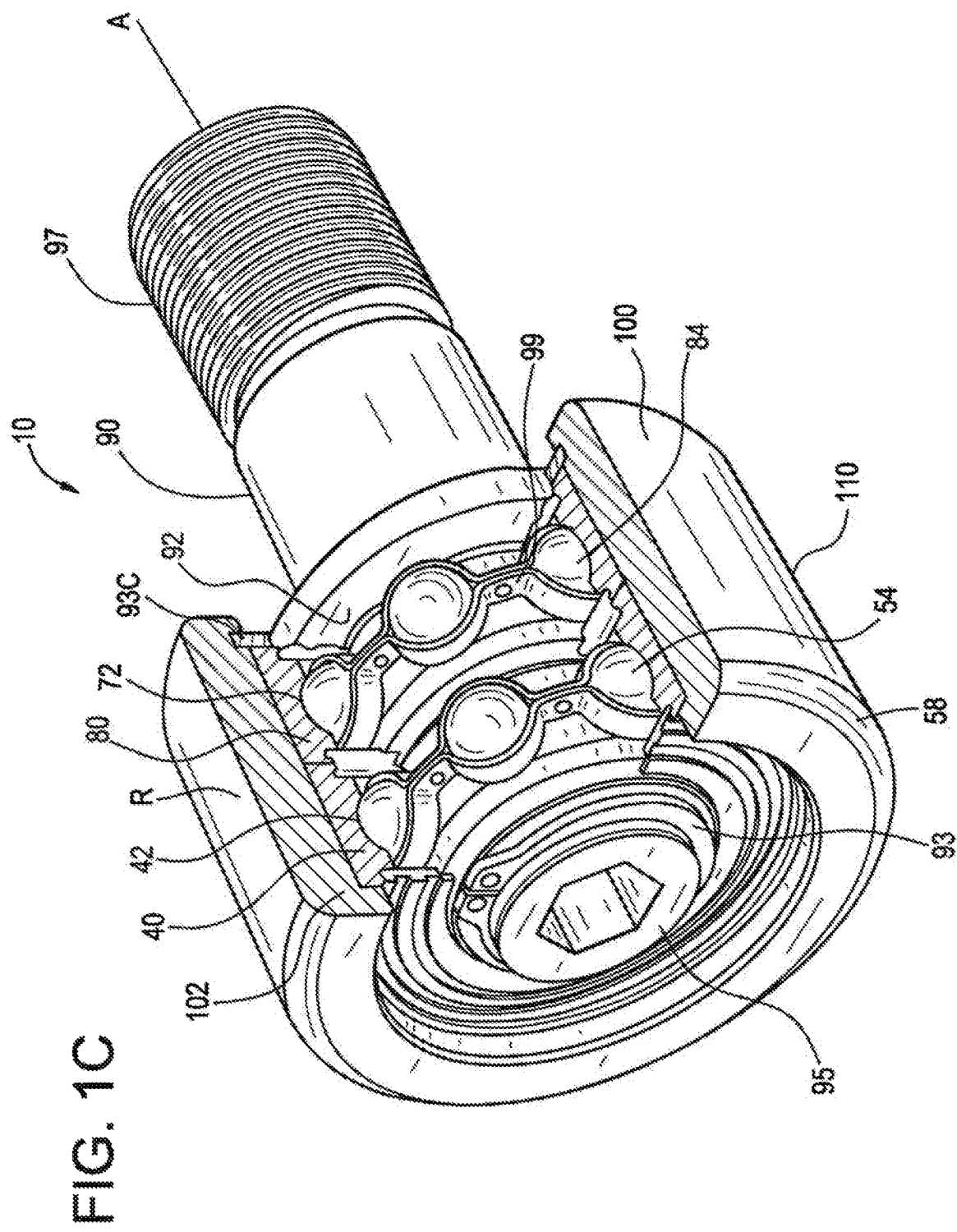
FIG. 1C is an isometric quarter section view of some of the elements of the cam follower shown in FIG. 1A.
Figure 2:
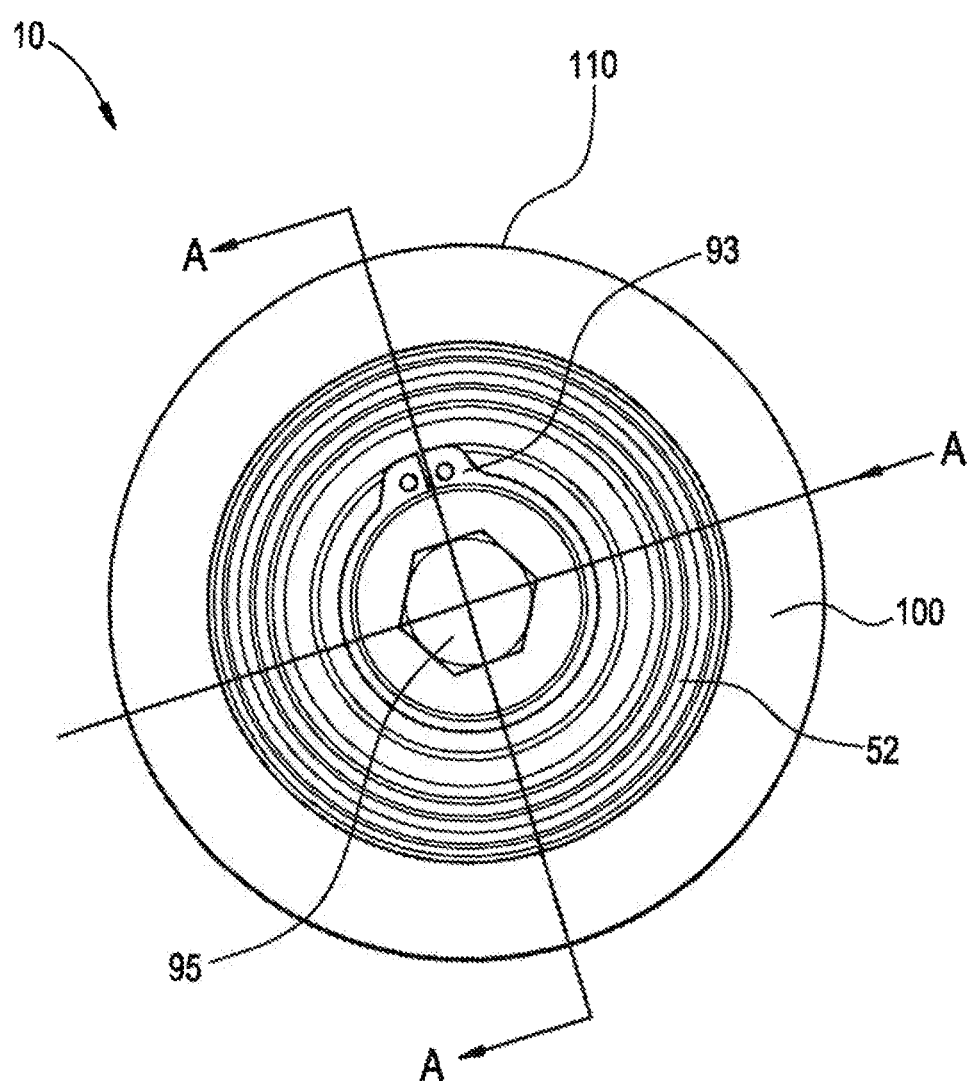
FIG. 2 is a side view of the cam follower shown in FIG. 1A.

As shown in FIGS. 1A-D and 2, a cam follower 10 for a ram of a necker machine is shown and is generally designated by the reference numeral 10. The cam follower 10 includes a first ball bearing 30 and a second ball bearing 60. The first ball bearing 30 and the second ball bearing 60 are configured in a tandem configuration. That is, they are positioned axially side to side, coaxially with a first axis of rotation A. In the embodiment shown, an inner ring 50 of the first ball bearing 30 and an inner ring 80 of the second ball bearing 60 are axially and radially fixed relative to each other about the first axis of rotation A.

The first ball bearing 30 includes a first outer ring 40 that has a first outer race 42 (also referred to as a bearing surface) and a first exterior surface 44. The first ball bearing 30 further includes the first inner ring 50 which has a first inner race 52 (also referred to as a bearing surface). The first inner ring 50 is coaxially disposed in the first outer ring 40. A first plurality of spherical balls 54 are disposed between the first outer race 42 and the first inner race 52. The first plurality of spherical balls 54 are in rolling engagement with the first outer race 42 and the first inner race 52 such that the first outer ring 40 is rotatable relative to the first inner ring 50 about the first axis of rotation A.

The first ball bearing 30 includes a second seal 56 extending radially between the first outer ring 40 and the first inner ring 50 on one side of the first plurality of spherical balls 54. The first ball bearing 30 further includes a first seal 58 that extends radially between the first outer ring 40 and the first inner ring 50 such that the first plurality of spherical balls 54 is sealingly positioned between the first seal 58 and the second seal 56. The first seal 58 and the second seal 56 are configured to retain a lubricant 57 inside an annular cavity 59 formed between the first outer race 42 and the first inner race 52 in which the first plurality of spherical balls 54 is disposed. The seals 56, 58 are made of a molded nitrile rubber, however, as can be appreciated by a person having ordinary skill in the art and familiar with this disclosure, the seals 56, 58, also referred to as shields, can employ different materials in alternate embodiments.

The lubricant 57 is selected to be maintenance free and to function for the useful life of the cam follower 10. In some embodiments, the lubricant 57 is a general-purpose wide temperature range grease having anti-oxidation and anti-wear properties.

In the embodiment disclosed in FIG. 1A, the second ball bearing 60 is similar in configuration to the first ball bearing 30. The second ball bearing 60 includes a second outer ring 70 that has a second outer race 72 (also referred to as a bearing surface) and a second exterior surface 74. The second ball bearing 60 further includes a second inner ring 80 that has a second inner race 82 (also referred to as a bearing surface). The second inner ring 80 is coaxially disposed in the second outer ring 70. A second plurality of spherical balls 84 are disposed between the second outer race 72 and the second inner race 82. The second plurality of spherical balls 84 are in rolling engagement with the second outer race 72 and the second inner race 82 such that the second outer ring 70 is rotatable relative to the second inner ring 80 about the first axis of rotation A.

The second ball bearing 60 includes a third seal 86 that extends radially between the second outer ring 70 and the second inner ring 80 on one side of the second plurality of spherical balls 84. The second bearing 60 further includes a fourth seal 88 that extends radially between the second outer ring 70 and the second inner ring 80 such that the second plurality of spherical balls 84 are sealingly positioned between the third seal 86 and the fourth seal 88. The seals 86, 88 are configured to retain the lubricant 57 inside an annular cavity 89 formed between the second outer race 72 and the second inner race 82. The second plurality of spherical balls are disposed in the annular cavity 89. The seals are made of a molded nitrile rubber, however, as can be appreciated by a person having ordinary skill in the art and being familiar with this disclosure, the seals 86, 88, also referred to as shields, can employ different materials in alternate embodiments.

In reference to the embodiment shown in FIGS. 1A, 1B, 1C, 1D, and 2, although the cam follower 10 is shown having a first ball bearing 30 and a second ball bearing 60, the present invention is not limited in this regard and, as will be appreciated by a person of ordinary skill in the art, many different configurations may be employed. For example, the present invention is practiced using a cam follower having a single row of roller or ball bearings. Or, for example, in one embodiment the present invention is practiced using a cam follower having a ball bearing wherein a single continuous outer ring defines a first outer race and a second outer race, and a single continuous inner ring defines a first inner raceway and a second inner raceway.

In the embodiment shown in in FIGS. 1A, 1B, 1C, 1D, and 2, the outer ring 40, the outer ring 70, the inner ring 50 and/or the inner ring, 80 are manufactured from a 52100 steel that is through hardened. The first plurality of spherical balls 54 and the second plurality of spherical balls 84 also are manufactured from a 52100 steel. As shown in FIG. 1C, each of the first plurality of spherical balls 54 are separated by a cage 99; and each of the second plurality of spherical balls 84 are separated by another cage 99. The cages 99 are manufactured from a low carbon soft steel. It should be understood that the present invention is not limited to using the cage 99 to separate adjacent spherical balls 54 from one another and another cage 99 to separate adjacent spherical balls 84, as different spacers, or no spacers, may be employed between the balls in the first plurality of spherical balls 54 and as different spacers, or no spacers, may be employed between the balls in the second plurality of spherical balls 84. It should also be understood that the present invention is not limited to balls, as other types of rolling elements may be employed with the present invention, for example, needle rollers.

Although specific materials are disclosed herein, a person of ordinary skill in the art and familiar with this disclosure will understand that the present invention is not limited in this regard, and that other materials may be used with the present invention.

In reference to in FIGS. 1A, 1B, 1C, 1D, and 2, the first inner ring 50 has a first bore 51 extending therethrough, and the second inner ring 80 has a second bore 81 extending therethrough. A shaft 90 is received through the first bore 51 and the second bore 81. In the embodiment shown in FIGS. 1A-2, the shaft 90 is press fit in the first bore 51 and the second bore 81 such that the first inner ring 50 and the second inner ring 80 are fixed relative to the shaft about the first axis of rotation A. The shaft 90, also referred to as a stud, extends between a first axial end 91 and a second axial end 96. The shaft 90 has a first groove 93A formed therein. The first groove 93A extends radially inward into the shaft 90 and circumferentially around the shaft 90 (e.g., continuously around). The first groove 93A is located proximate the first axial end 91 of the shaft 90.

The first ball bearing 30 and the second ball bearing 60 axially abut one another and are received on the shaft 90 proximate to the first axial end 91, thereof. The shaft 90 has a shoulder 92 projecting radially outward from the shaft 90. The shoulder 92 is located between the first axial end 91 and the second axial end 96. Once assembled, the second inner ring 80 abuts the shoulder 92 to inhibit axial movement of the ball bearings 30, 60 relative to the shaft 90. A first clip 93 is fixedly received in the groove 93A on the shaft 90, such that the first inner ring 50 of first ball bearing 30 and the second inner ring 80 of the second ball bearing 60 are disposed and retained axially between the first clip 93 and the shoulder 92. A tire 100 extends circumferentially around the first outer ring 40 and the second outer ring 70. A second groove 93C is formed in tire 100. The second groove 93C extends circumferentially around and radially outward into the tire 100. The second groove 93C is located proximate an inner axial end of the second outer ring 70. The tire 100 has a radially inward projecting flange 112 located proximate an outer axial end of the first outer ring 40 proximate to the first axial end 91 of the shaft 90. A second clip 93B is seated in the second groove 93C to axially retain first outer ring 40 and the second outer ring 70 between the second clip and the flange 112 and to inhibit axial movement of the ball bearings 30, 60 relative to the shaft 90. The first clip 93 engages the inner ring 50 of the first ball bearing 30 to axially secure the first ball bearing 30 on the shaft 90 and second clip 93B engages the outer ring 70 of the second ball bearing 60 to axially secure the second ball bearing 60 to the tire 100. The second inner ring 80 abuts the shoulder 92 of the shaft 90 such that the first inner ring 50 and the second inner ring 80 are fixed relative to one another and fixed relative to the A axis along the shaft 90. The first ball bearing 30 and the second ball bearing 60 are located symmetrically on opposing sides of an apex R' of the cam follower crown radius R such that the first ball bearing 30 and the second ball bearing 60 axially abut one another under the apex R' to optimize load distribution. To accomplish this symmetry, the first clip 93 and the second clip 93B are secured about the shaft 90 such that first clip 93 and the second clip 93B are equidistant from the center axis B. This allows for equalization of load sharing by the first ball bearing 30 and the second ball bearing 60 for improved performance compared to prior art cam followers.

As shown in FIG. 1B, the shaft 90 includes a face 94 at the first axial end 91 perpendicular to the first axis of rotation A. The face 94 has a recessed hexagonal socket 95 configured to receive a hex wrench, or the like, for rotating the shaft 90 about the first axis of rotation A. The shaft 90 further includes a plurality of threads 97 on a radial outside surface 97A of the shaft 90. In this way, the shaft 90 can be received in a bore (not shown) comprising a complementary thread pattern, or can similarly be received in a nut or the like having a complementary thread pattern. The shaft also included a hollow portion 98. This allows for weight reduction of shaft 90 for efficiency of operation, thus allowing additional mass of a tire 100, as described herein.

The first ball bearing 30 and the second ball bearing 60 are received in the tire 100. In some embodiments, the tire 100 is made from a metallic material. In one embodiment, the tire is made from steel. In a particular embodiment, the tire 100 is made from carburized steel and includes an optional black oxide coating for maximum wear resistance. It should be appreciated that in alternate embodiments different tire materials and different tire sizes are used for the tire 100. Further, the cam follower 10 is versatile in that in some embodiments the tires 100 are interchangeable with, for example, tires made of other metallic materials and tires made from elastomers, polymers or combinations thereof. The tire 100 has an exterior surface 110, which includes a crown radius R and an apex R'. The crown radius R is bowed about the center axis B, which is substantially perpendicular to axis A. The tire 100, includes a flange 112. Flange 112, in cooperation with the clip 93B, axially secures the first outer ring 40 and the second outer ring 70 to the tire 100 such that the tire is axially fixed to the first ball bearing 30 and the second ball bearing 60. As shown in FIG. 1B, tire 100 has a thickness T1. The exterior surface 110 of the tire 100 engages the cam (not shown) during operating of the necker in accordance with the present invention.

A pitch radius PR is defined as the distance between the midpoint of any one of the first plurality of spherical balls 54 and the axis A as shown in FIG. 1B. The pitch radius PR is also defined as the distance between the midpoint of any one of the second plurality of spherical balls 84 and the axis A as shown in FIG. 1B. The ratio of the thickness T1 of the tire 100 to the pitch radius PR (i.e., T1 divided by PR) is between about 0.18 and about 0.19. Additionally, the ratio of the depth D1 of the first groove 93A (that the first clip 93 is disposed in) to the thickness T1 of the tire 100 (i.e., D1 divided by T1) is between about 0.17 and about 0.19. Further, the ratio of the depth D2 of the second groove 93C (that the second clip 93B is disposed in) to the thickness T1 of the tire 100 (i.e., D2 divided by T1) is between about 0.17 and about 0.19. The depth D1 of the first groove 93A and the depth D2 of the second groove 93C are sized to provide a sufficient thickness of material to withstand axial forces and to axially retain the first outer ring 40 and the second outer ring 70 at a fixed axial position on the shaft 90 while allowing the first outer ring 40 and the second outer ring 70 to rotate around the shaft 90. In some embodiments, the depth D1 of the first groove 93A is equal to the depth D2 of the second groove 93C. The 0.17 and about 0.19 ratio of the depth D2 of the second groove 93C to the tire thickness T1 also allows for minimization of the weight of the (e.g. metallic) tire 100 while maintaining sufficient material thickness of the tire 100 to meet strength and wear requirements for the tire 100.

Figure 3:
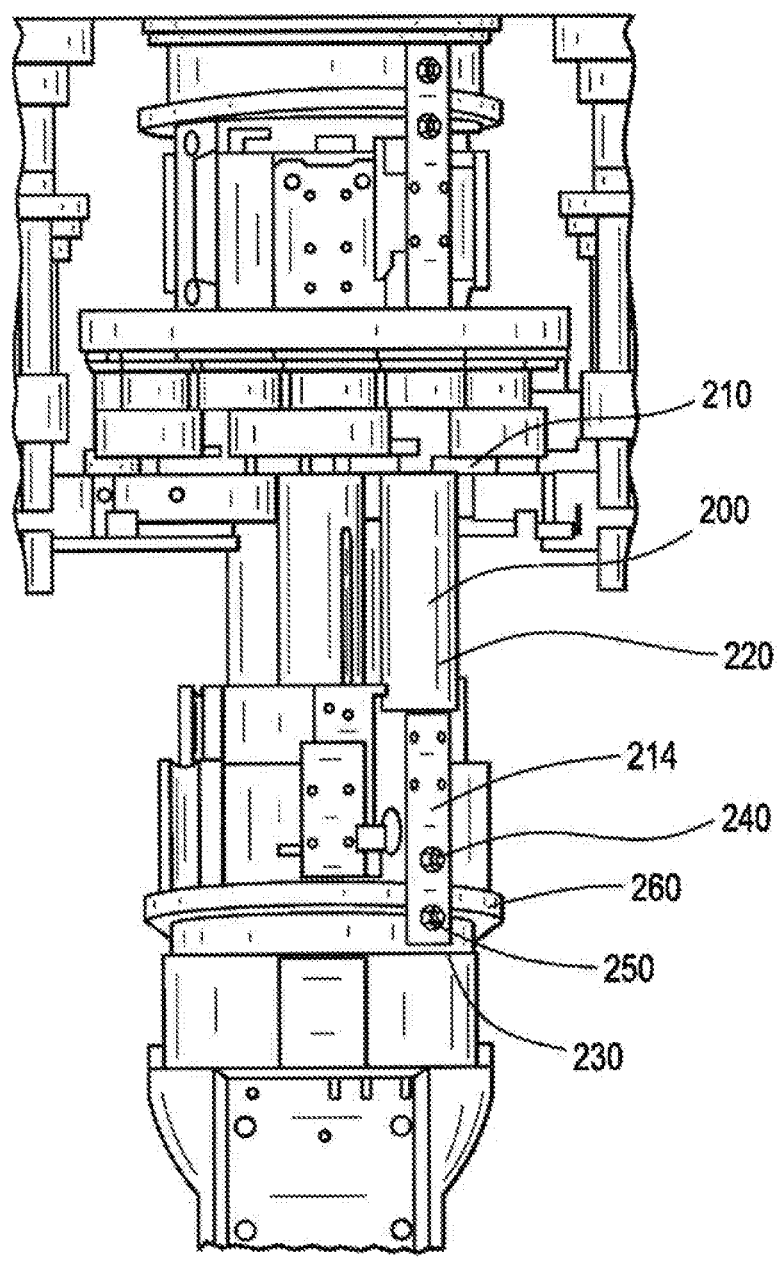
FIG. 3 is a perspective view of a necker machine ram in accordance with one embodiment of the present invention in which two cam followers are coupled thereto.
Figure 4:
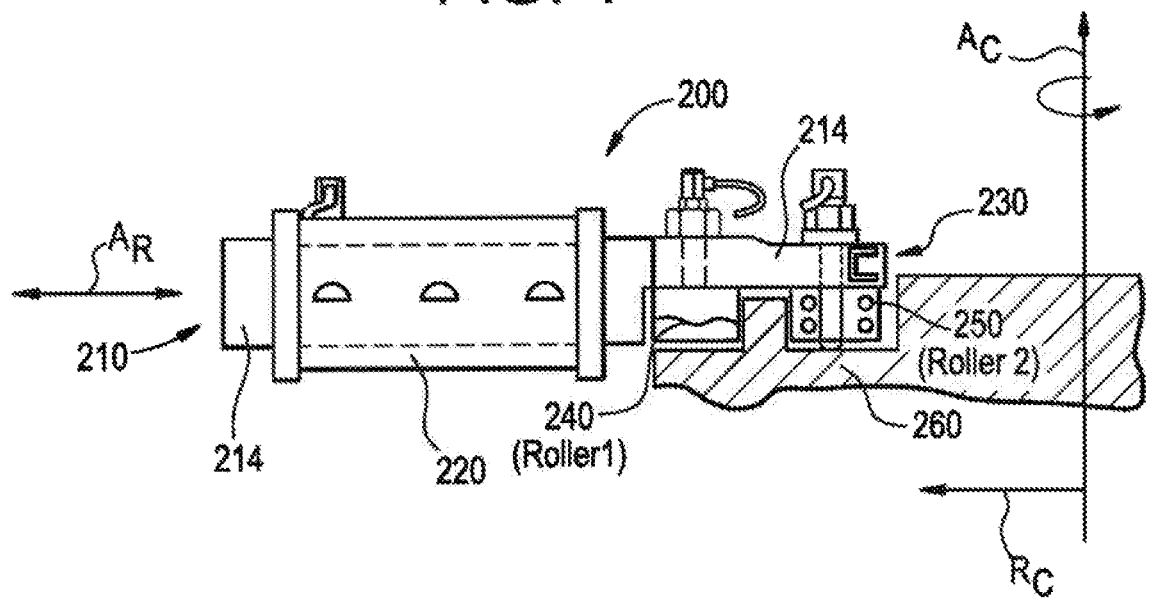
FIG. 4 is a front view of the necker machine ram shown in FIG. 3

In reference to FIGS. 3 and 4, a ram assembly 200 for a necker machine (not shown) in accordance with the present invention is shown. In such a can making necker machine, a cam follower rides on a rotating cam 260 with the rotational axis $A_C$ parallel to the surface of the cam 260. The ram assembly 200 extends between a first axial end 210 and a second axial end 230. The ram assembly 200 includes a fixed bushing 220 having a bore extending therethrough between the first axial end 210 and the second axial end 230. A ram piston 214 extends through both ends of the bore of the fixed bushing 220. Proximate to the second axial end of the ram 230, two cam followers (similar to the cam follower 10 illustrated in FIGS. 1A-C, 2 and described in detail herein) extend radially therefrom. Referring to FIG. 4, the cam followers 10, including a first roller 240 and a second roller 250, ride on a surface of a cam 260, with one roller 240, 250 located on each side of the cam 260, as the rollers rotate around the rotational axis of the cam $A_C$. The ram 214 is moved back and forth along the axis $A_R$ by the attached rollers 240, 250 in an accelerating and decelerating movement following a profile of the cam 260. Considerable radial force (i.e., force along the cam radial axis $R_C$) is developed on the rollers 240, 250 during the can necking operation.

Selection of the spherical ball (e.g. 54, 84) geometry for optimum service life via computer modeling of the bearing design was performed utilizing the load duty cycle of the necker machine as input. Necker machines can run 24 hours a day, 7 days a week and can process from about 2700 cans per minute to about 3000 cans per minute. Due to the unique geometry and corresponding efficiency, the instant cam follower design accommodates higher outputs of up to about 3350 cans per minute.

The geometry of the first ball bearing and the second ball bearing 60 is selected to yield maximum load capacity and to allow the end user to stipulate the outer diameter of the tire 100, as previously discussed. Specifically, the geometry of the spherical balls 54, 84, the inner rings 50, 80, and the outer rings 40, 70 are adjusted to minimize the internal clearance C1, C2 in the respective bearing 30, 60 thereby optimizing load distribution and service life. FIG. 1D depicts an internal clearance C1, C2 between the spherical ball 54 and the inner race 52 or outer race 42 of the first bearing 30. FIG. 1D is also representative of the first bearing 30', the second bearing 60', the third bearing 30", and the fourth bearing 60" as discussed herein with regards to FIG. 8A. Press fitting the interior surface 116 of the tire 100 over the outer rings 40, 70 adjusts the internal clearance C1, C2. Generally, ball bearings have an industry standard internal clearance or looseness, which is reduced by the interference press fit of the outer rings 40, 70 into the tire 100. By reducing this internal clearance C1, C2, more spherical balls 54, 84 within each bearing 30, 60 share the applied load, thereby increasing and optimizing the bearing life. In some embodiments, the internal clearance is between 0.0002 inches and 0.0008 inches. The applied load per duty cycle is discussed below with regards to FIGS. 5-7 and 10A-12. A distance R1 is defined by the distance from the exterior surface 44, 74 of the outer ring 40, 70 to the shaft axis A. A distance R2 is defined by the distance from shaft axis A to an interior surface 116 of the tire 100. The ratio of R1 to R2 is adjusted to optimize the load distribution. By maintaining a R1:R2 ratio between about 1.000 and about 1.015, improved load sharing and longer bearing life is realized.

Figure 5:
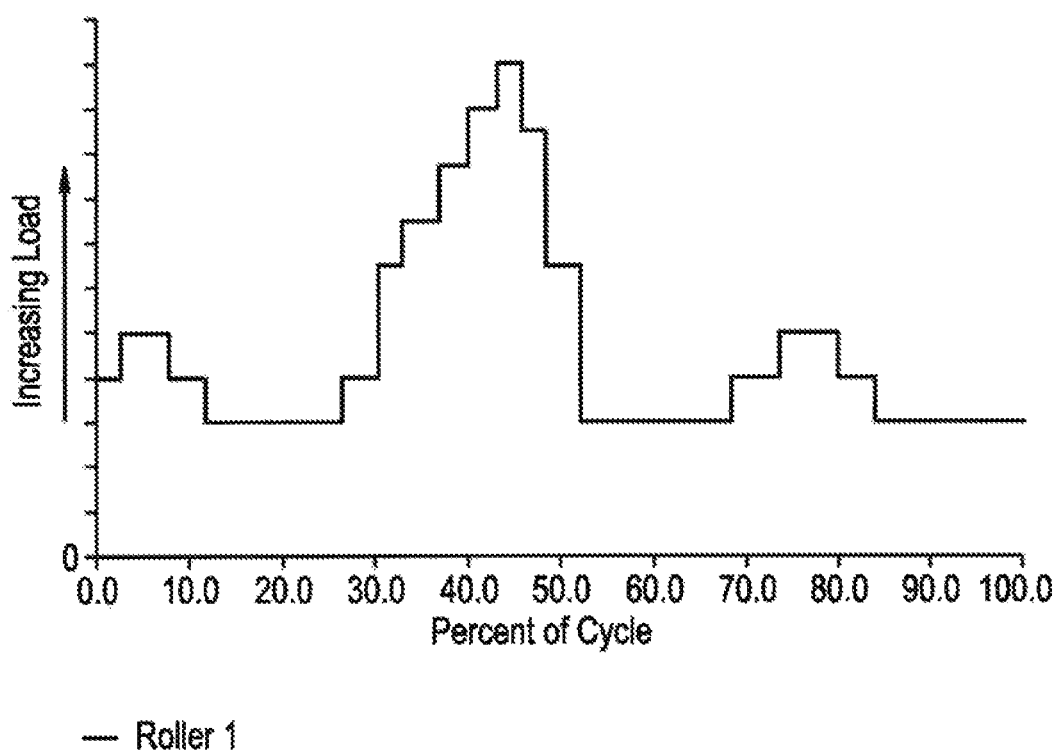
FIG. 5 is a duty cycle load chart for a first cam follower.
Figure 6:
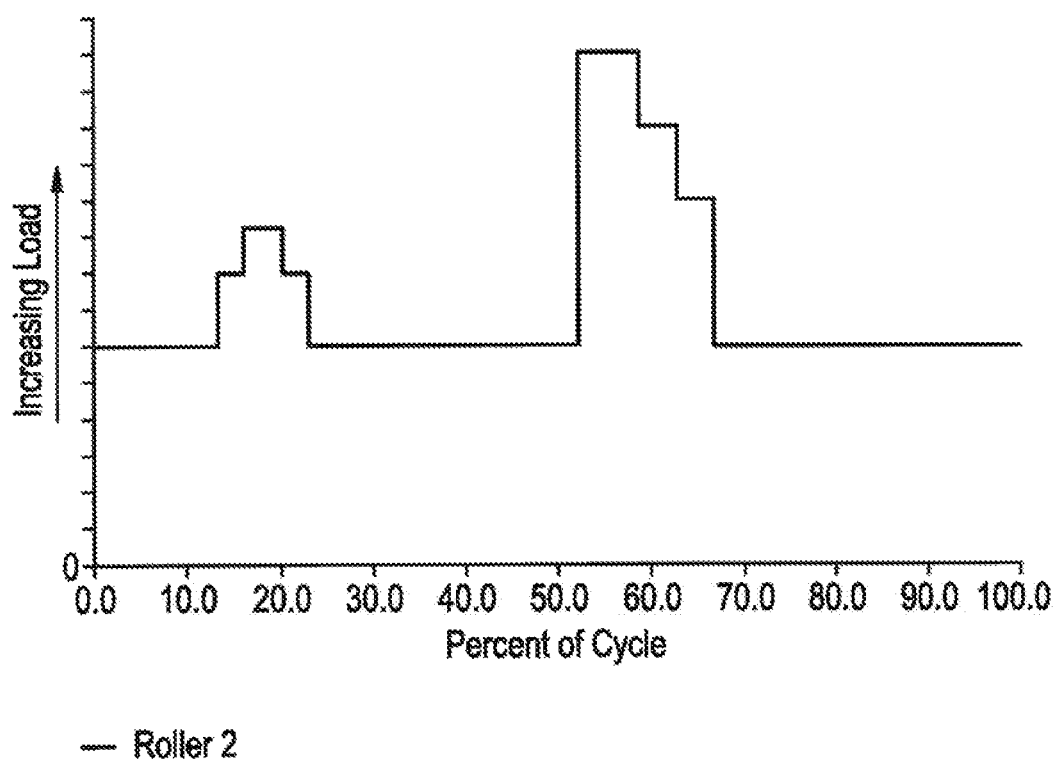
FIG. 6 is a duty cycle load chart for a second cam follower.

FIG. 5 depicts a duty cycle load chart for a first cam follower 1 ("Roller 1" in FIG. 4). FIG. 6 depicts a second duty cycle for a second cam follower 2 ("Roller 2" in FIG. 4). Roller 1 pushes a ram and a can into the work zone while roller 2 reacts the work load and returns the ram. Each duty cycle represents one revolution of the cam. The load is shown in the ordinate while the % of cycle is shown in the abscissa. With regard to FIG. 5, the peak load for roller 1 occurs at between about 40% and 50% of the duty cycle (i.e. between about 144 degrees and 180 degrees of the 360-degree duty cycle). Likewise, referring to FIG. 6, the peak load for roller 2 occurs at between about 50% and 60% of the duty cycle (i.e. between about 180 degrees and 216 degrees of the 360-degree duty cycle).

The resulting duty cycle life results for two rollers (e.g. 240, 250; see FIG. 4) are shown in FIG. 7. Roller 1 (240) and roller 2 (250) each have one of a ball bearing pairs identified as 6003 and 6202. The 6003 bearings are standard size, whereas the 6202 bearings are packed more tightly due to having smaller diameters. Thus, load sharing is improved and the life tests demonstrate significantly improved results. Unfactored life, factored life and full factored life are shown in hours. Unfactored life is the most conservative prediction (no lubrication or special materials), factored life includes vacuum degassed steel and less conservative regarding predicted life, whereas fully factored prediction includes the effects of lubrication and steel properties, a more realistic and less conservative prediction. As shown, the fully factored life prediction for roller 1 improved from 8,640 hours for bearing pair 6003 to 21,787 hours for bearing pair 6202. Likewise, an improvement from 23,600 hours (bearing pair 6003) to 60,482 hours (bearing pair 6202) was demonstrated for roller 2. Thus, a significant and unexpected improvement in bearing life expectancy for a maintenance free cam follower has been demonstrated herein.

An alternate embodiment includes two independently rotatable cam follower segments, for example first cam follower segment 10A' and second cam follower segment 10B', as depicted in FIG. 8A. The first cam follower segment 10A' and the second cam follower segment 10B' are mounted on a shaft 90' that extends from a first axial shaft end 91' to a second axial shaft end 96'. The shaft 90' has a first groove 93A' proximate to the first axial shaft end 91'. The shaft 90' has a shoulder 92' formed thereon between the first groove 93A' and the second axial shaft end 96'. A first clip 93' is radially engaged in the first groove 93A'.

The first cam follower segment 10A' contains a first ball bearing 30' and a second ball bearing 60'. The first ball bearing 30' includes a first inner ring 50' and a first outer ring 40'. A plurality of rolling elements in the form of a first plurality of spherical balls 54' is disposed between the first inner ring 50' and the first outer ring 40'. A first seal 58' extends radially between an axial end 50X' of the first inner ring 50' and an axial end 40X' of the first outer ring 40'. A second seal 56' extends radially between an axial end 50Y' of the first inner ring 50' and an axial end 40Y' of the first outer ring 40'. The first seal 58', the second seal 56', an outer surface of the first inner ring 50', and an inner surface of the first outer ring 40' define a first annular cavity 59'. The first plurality of spherical balls 54' are retained radially between a first inner race 52' of the first inner ring 50' and a first outer race 42' of the first outer ring 40'.

The second ball bearing 60' includes a second inner ring 80' and a second outer ring 70'. A plurality of rolling elements in the form of a second plurality of spherical balls 84' is disposed between the second inner ring 80' and the second outer ring 70'. A third seal 86' extends radially between an axial end 80X' of the second inner ring 80' and an axial end 70X' of the second outer ring 70'. A fourth seal 88' extends radially between an axial end 80Y' of the second inner ring 80' and an axial end 70Y' of the second outer ring 70'. The third seal 86', the fourth seal 88', an outer surface of the second inner ring 80', and an inner surface of the second outer ring 70' define a second annular cavity 89'. The second plurality of spherical balls 84' are retained radially between a second inner race 82' of the second inner ring 80' and a second outer race 72' of the second outer ring 70'.

In the embodiment depicted in FIG. 8A, the second axial shaft end 96' engages a complementary bore in the housing 114. A cylindrical shank surface 91A' of the shaft 90' is defined between the first groove 93A' and the shoulder 92' of the shaft 90'. A first tire 100' wraps around the first ball bearing 30' and the second ball bearing 60'. A first flange 112' extends radially inward from a first axial tire end 100X' of the first tire 100' and a second groove 93C' interrupts (e.g., extends radially outward into the tire and circumferentially therearound) a radially inward surface of the first tire 100' proximate to a second axial tire end 100Y' of the first tire 100'. The first flange 112' axially abuts the axial end 40X' of the first outer ring 40' and a second clip 93B', radially engaging the second groove 93C', axially abuts the axial end 70Y' of the second outer ring 70'. An axial end 50X' of the first inner ring 50' axially abuts the first clip 93' and an axial end 80Y' of the second inner ring 80' axially abuts a spacer 101.

In one embodiment, shown in FIG. 8B, the shaft 90 includes a lubrication passage 1000 extending axially therethrough and having a branch connection 1000B extending radially outward therefrom. A plug 1000P is removably secured in the passage 1000, proximate the second end 96 of the shaft for sealing the passage 1000. The branch connection 1000B is configured for lubricating the housing 114 of portions of the necker machine. A grease fitting, such as a Zerk fitting (not depicted), is incorporated into the first axial shaft end 91' to supply grease to the lubrication passage 1000.

The second cam follower segment 10B' contains a third ball bearing 30" and a fourth ball bearing 60". The third ball bearing 30" includes a third inner ring 50" and a third outer ring 40". A plurality of rolling elements in the form of a third plurality of spherical balls 54" is disposed between the third inner ring 50" and the third outer ring 40". A fifth seal 58" extends radially between an axial end 50X" of the third inner ring 50" and an axial end 40X" of the third outer ring 40". A sixth seal 56" extends radially between an axial end 50Y" of the third inner ring 50" and an axial end 40Y" of the third outer ring 40". The fifth seal 58", the sixth seal 56", an outer surface of the third inner ring 50", and an inner surface of the third outer ring 40" define a third annular cavity 59". The third plurality of spherical balls 54" are retained radially between a third inner race 52" of the third inner ring 50" and a third outer race 42" of the third outer ring 40".

The fourth ball bearing 60" includes a fourth inner ring 80" and a fourth outer ring 70". A plurality of rolling elements in the form of a fourth plurality of spherical balls 84" is disposed between the fourth inner ring 80" and the fourth outer ring 70". A seventh seal 86" extends radially between an axial end 80X" of the fourth inner ring 80" and an axial end 70X" of the fourth outer ring 70". An eighth seal 88" extends radially between an axial end 80Y" of the fourth inner ring 80" and an axial end 70Y" of the fourth outer ring 70". The seventh seal 86", the eighth seal 88", an outer surface of the fourth inner ring 80", and an inner surface of the fourth outer ring 70" define a fourth annular cavity 89".

The fourth plurality of spherical balls 84" are retained radially between a fourth inner race 82" of the fourth inner ring 80" and a fourth outer race 72" of the fourth outer ring 70". The axial end 80X" of the fourth inner ring 80" axially abuts the axial end 50Y" of the third inner ring 50" and the axial end 80Y" of the fourth inner ring 80" axially abuts the shoulder 92'. A second tire 100" wraps around the third ball bearing 30" and the fourth ball bearing 60". A second flange 112" extends radially inward from a third axial tire end 100X" of the second tire 100" and a third groove 93C" interrupts an inner surface of the second tire 100" proximate to a fourth axial tire end 100Y". The second flange 112" axially abuts the axial end 40X" of the third outer ring 40" and a third clip 93B", radially engaging the third groove 93C", axially abuts the axial end 70Y" of the fourth outer ring 70". An axial end 50X" of the third inner ring 50" axially abuts the spacer 101 and an axial end 80Y" of the fourth inner ring 80" axially abuts the shoulder 92'. The spacer 101 is disposed on the shaft 90' between and abutting the second inner ring 80' and the third inner ring 50". The first inner ring 50', second inner ring 80', the spacer 101, the third inner ring 50" and the fourth inner ring 80" are axially fixed to the shaft 90' by the first clip 93' and the shoulder 92.

In the embodiment depicted in FIG. 8A, the first cam follower segment 10A' is spaced apart from the second cam follower segment 10B' by the spacer 101. An axial stackup is defined as the total axial length of the first inner ring 50', the second inner ring 80', the spacer 101, the third inner ring 50", and the fourth inner ring 80". The axial stackup is axially retained by the first clip 93A' engaging the first groove 93A' at one axial end and the shoulder 92' at an opposite axial end.

In the embodiment depicted in FIG. 8A, the first seal 56' is fixed to the first outer ring 40', the third seal 86' is fixed to the second outer ring 70', the fifth seal 58" is fixed to the third outer ring 40", and the seventh seal 86" is fixed to the fourth outer ring 70". The second seal 56' is fixed to the first outer ring 40', the fourth seal 88' is fixed to the second outer ring 70', the sixth seal 54" is fixed to the third outer ring 40", and eighth seal 88" is fixed to the fourth outer ring 70". While each of the seals is fixed to the respective outer ring, fixing each of the seals to the respective inner ring does not depart from the scope of the present disclosure.

In the embodiment depicted in FIG. 8A, the geometry of the bearings 30', 60', 30", 60" is also selected to yield maximum load capacity for the end user's stipulated outer diameter of the tire 100', 100". The optimum load distribution and service life is obtained by controlling the internal clearance by press fitting the first tire 100' over the first outer ring 40' of the first bearing 30' and the second outer ring 70' of the second bearing 60' and by press fitting the second tire 100" over the third outer ring 40" of the third bearing 30" and over the fourth outer ring 70" of the fourth bearing 60".

Figure 9:
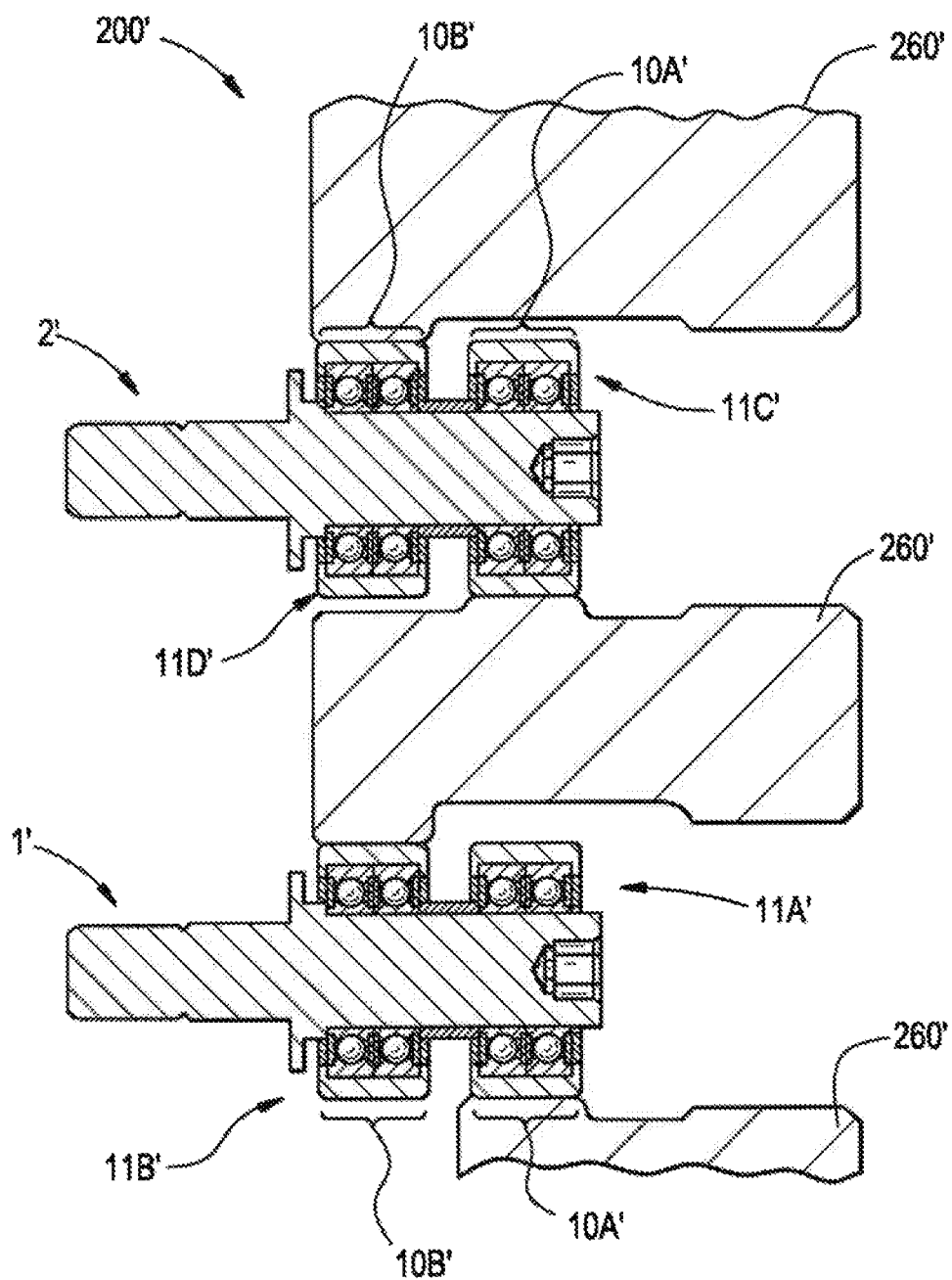
FIG. 9 is a partial cross-sectional view of a necker machine ram in accordance with another embodiment of the present invention in which two cam followers are coupled thereto.

In reference to FIGS. 9-12, an alternate embodiment of a ram assembly 200' for a necker machine has an inner follower 1' and an outer follower 2'. FIG. 9 depicts the inner follower 1' and the outer follower 2' riding on a rotating cam 260'. The inner follower 1' includes an outboard roller at a location marked with the arrow 11A' in the form of the first cam follower segment 10A' and an inboard roller at a location marked with the arrow 11B' in the form of the second cam follower segment 10B'. The outer follower 2' includes an outboard roller at a location marked with the arrow 11C' in the form of the first cam follower segment 10A' and an inboard roller at a location marked with the arrow 11D' in the form of second cam follower segment 10B'. In the embodiment depicted in FIG. 9, the first cam follower segments 10A' and the second cam follower segments 10B' engage opposing surfaces of the rotating cam 260'.

Figure 10A:
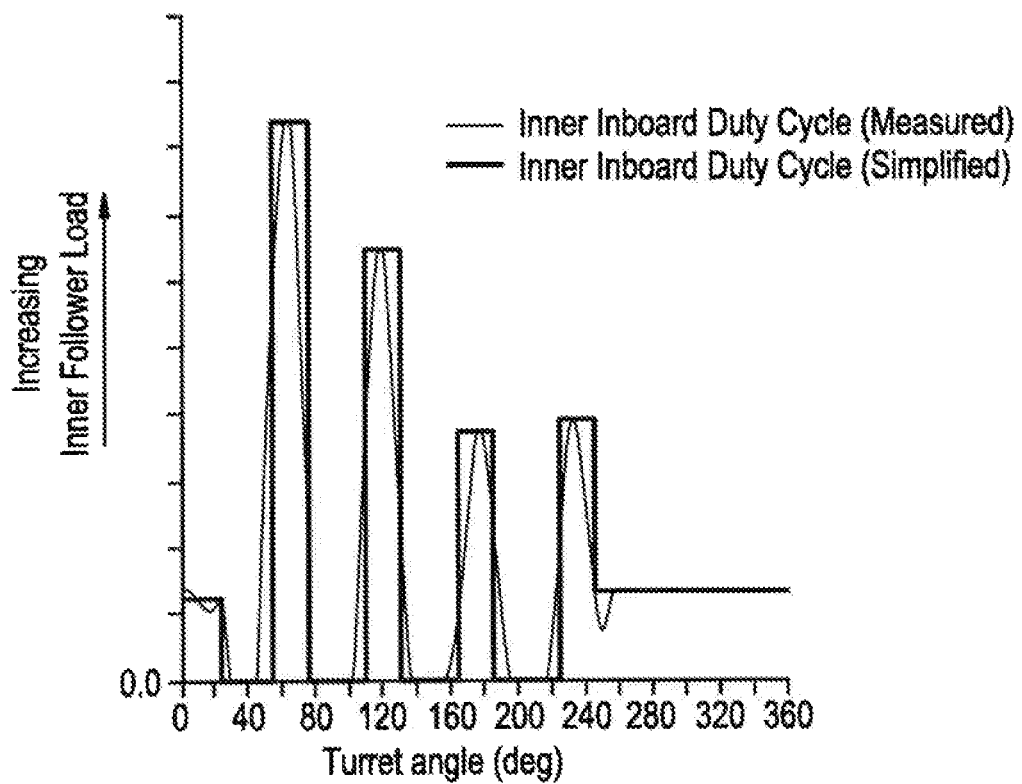
FIG. 10A is a duty cycle load chart for an inner inboard cam follower of the embodiment depicted in FIG. 9.
Figure 10B:
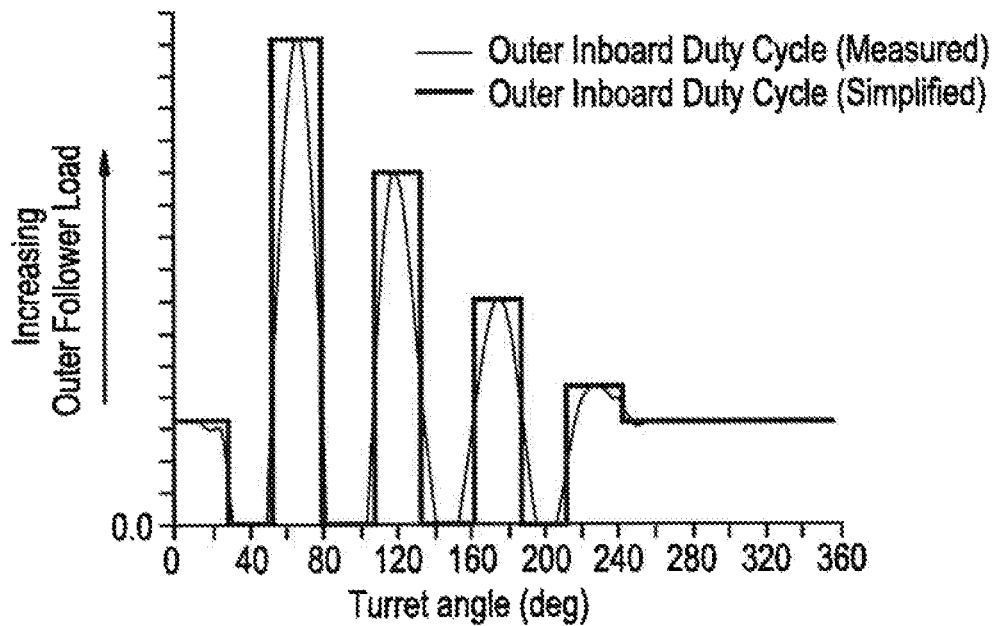
FIG. 10B is a duty cycle load chart for an outer inboard cam follower of the embodiment depicted in FIG. 9.
Figure 11A:
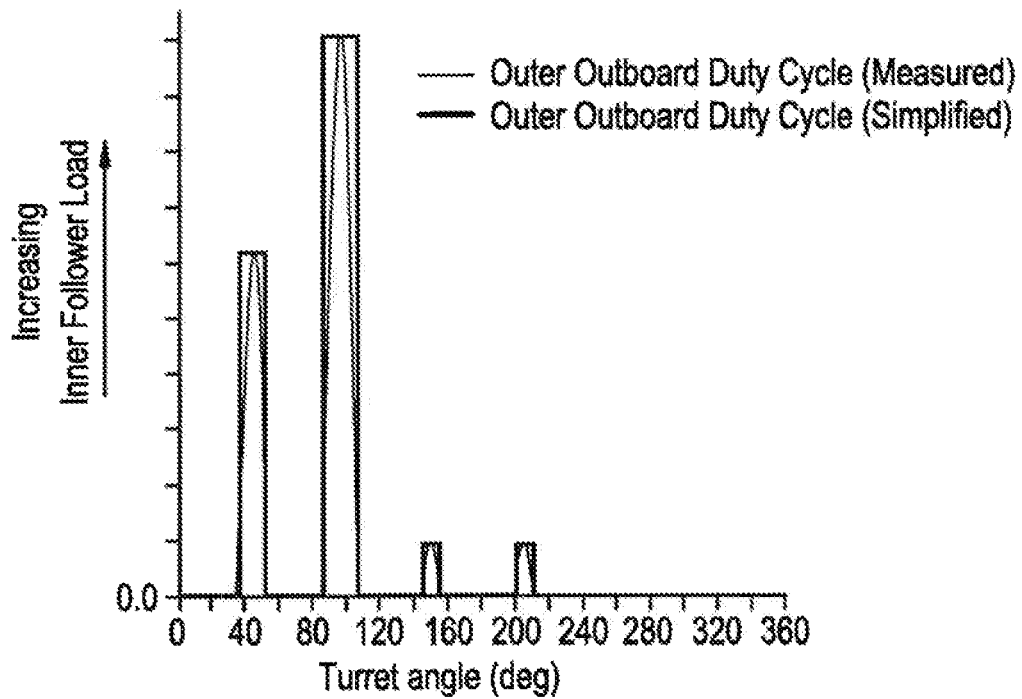
FIG. 11A is a duty cycle load chart for an outer outboard cam follower of the embodiment depicted in FIG. 9.
Figure 11B:
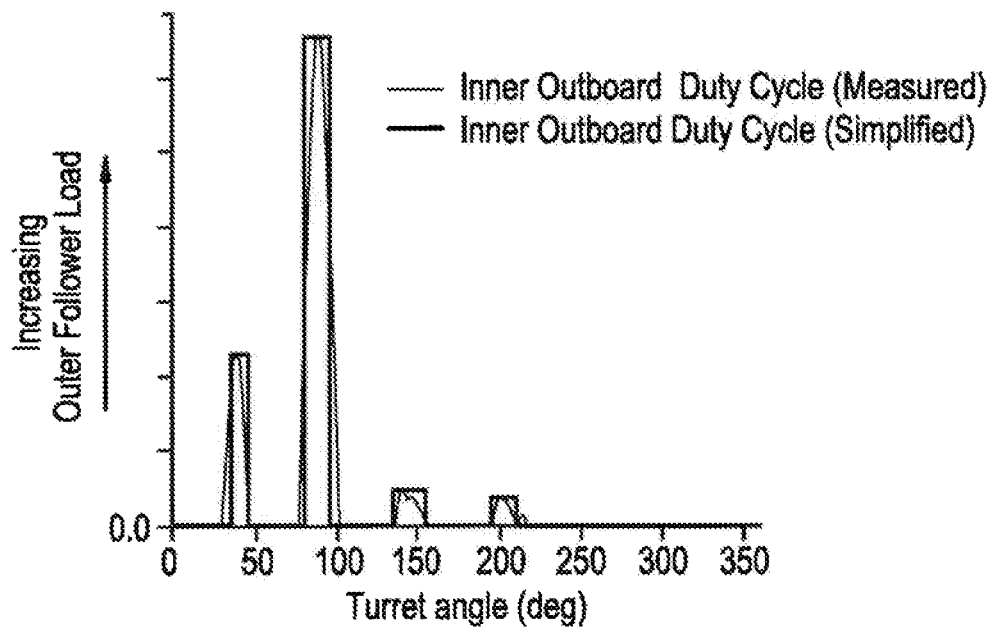
FIG. 11B is a duty cycle load chart for an inner outboard cam follower of the embodiment depicted in FIG. 9.

In FIGS. 10A, 10B, 11A and 11B the increasing load is shown in the ordinate while the turret angle in degrees (e.g., cycle) is shown in the abscissa. FIG. 10A depicts the duty cycle load chart for the inboard roller or second tire 10B' of the inner follower 1' wherein measured values of the inner inboard load as a function of turret angle is shown in the light solid line and the simplified inner inboard duty cycle is shown in the solid bold line. The simplified inner inboard duty cycle provides an efficient manner to analyze and/or utilize the measured inner inboard duty cycle and simplifies the life calculations. FIG. 10B depicts the duty cycle load chart for the inboard roller or fourth tire 10D' of the outer follower 2' wherein measured values of the outer inboard load as a function of turret angle is shown in the light solid line and the simplified outer inboard duty cycle is shown in the solid bold line. The simplified outer inboard duty cycle provides an efficient manner to analyze and/or utilize the measured outer inboard duty cycle and simplifies the life calculations. FIG. 11A depicts the duty cycle load chart for the outboard roller or third tire 10C' of the outer follower 2' wherein measured values of the outer outboard load as a function of turret angle is shown in the light solid line and the simplified outer outboard duty cycle is shown in the solid bold line. The simplified outer outboard duty cycle provides an efficient manner to analyze and/or utilize the measured outer outboard duty cycle and simplifies the life calculations. FIG. 11B depicts the duty cycle load chart for the outboard roller or first tire 10A' of the inner follower 1' wherein measured values of the inner outboard load as a function of turret angle is shown in the light solid line and the simplified inner outboard duty cycle is shown in the solid bold line. The simplified inner outboard duty cycle provides an efficient manner to analyze and/or utilize the measured inner outboard duty cycle and simplifies the life calculations.

The resulting duty cycle life results for the rollers evaluated in FIGS. 10A-11B are shown in FIG. 12. For the outer inboard roller or tire 10D' FIG. 12 illustrates an individual ball bearing life of 52,610 hours and a roller assembly life of 28,193 hours for a roller speed of 5110 rotations per minute (RPM). For the outer outboard roller or tire 10C' FIG. 12 illustrates an individual ball bearing life of 294,860 hours and a roller assembly life of 138,010 hours for a roller speed of 5110 rotations per minute (RPM). For the inner inboard roller or tire 10B' FIG. 12 illustrates an individual ball bearing life of 464,150 hours and a roller assembly life of 248,730 hours for a roller speed of 3725 rotations per minute (RPM). For the inner outboard roller or tire 10A', FIG. 12 illustrates an individual ball bearing life of 2,072,500 hours and a roller assembly life of 1,110,600 hours for a roller speed of 3725 rotations per minute (RPM).

The design of the ball bearings disclosed herein adjusts the aforementioned internal clearance for optimum load distribution and service life. In some embodiments, the interference press fit into the cam follower wheel ranges from 0.0003 inches to 0.0013 inches of interference fit, resulting in an internal clearance at or near 0.0002 inches.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cam follower comprising:
   a shaft extending from a first axial shaft end to a second axial shaft end, the shaft having a first groove proximate to the first axial shaft end, a shoulder formed in the shaft between the first groove and the second axial shaft end, and a first clip radially engaged in the first groove;
   a first cam follower segment comprising a first tire defining a first interior area and the first cam follower segment having a first ball bearing and a second ball bearing partially disposed in the first interior area;
   a second cam follower segment comprising a second tire defining a second interior area, the second cam follower segment having a third ball bearing and a fourth ball bearing partially disposed in the second interior area, and
   a spacer disposed on the shaft between the second ball bearing and the third ball bearing;
   wherein the first cam follower segment and the second cam follower segment are axially retained on the shaft by the first clip, the spacer and the shoulder.

2. The cam follower of claim 1, wherein:
   (a) the first tire comprises:
      (i) a first flange extending radially inward from the first tire and located at a first axial tire end of the first tire;
      (ii) a second groove extending radially outward into the first tire and located at a second axial tire end of the first tire; and
      (iii) a second clip is engaged in the second groove; and
   (b) the second tire comprises:
      (i) a second flange extending radially inward from the second tire and located at an third axial tire end of the second tire;
      (ii) a third groove extending radially outward into the second tire and located at a fourth axial tire end of the second tire; and
      (iii) a third clip engaged in the third groove.

3. The cam follower of claim 1, wherein:
   the first ball bearing has a first inner ring disposed in a first outer ring and has a first plurality of spherical balls disposed between the first inner ring and the first outer ring;
   the second ball bearing has a second inner ring disposed in a second outer ring and has a second plurality of spherical balls disposed between the second inner ring and the second outer ring;
   the first inner ring axially abuts the second inner ring and the first clip, the first outer ring axially abuts the second outer ring and the first flange, and the second outer ring axially abuts the second clip;
   the third ball bearing has a third inner ring disposed in a third outer ring and has a third plurality of spherical balls disposed between the third inner ring and the third outer ring;
   the fourth ball bearing has a fourth inner ring disposed in a fourth outer ring and has a fourth plurality of spherical balls disposed between the fourth inner ring and the fourth outer ring;
   the third inner ring axially abuts the fourth inner ring, and the fourth inner ring axially abuts the shoulder, the third outer ring axially abuts the second flange and the fourth outer ring, and the fourth outer ring axially abuts the third outer ring; and the spacer abuts the second inner ring and the third inner ring.

4. The cam follower of claim 3, wherein:

the first plurality of spherical balls being disposed between a second seal and a first seal, the second seal and the first seal sealing a first lubricant therebetween;

the second plurality of spherical balls being disposed between a third seal and a fourth seal, the third seal and the fourth seal sealing a second lubricant therebetween;

the third plurality of spherical balls being disposed between a sixth seal and a fifth seal, the sixth seal and the fifth seal sealing a third lubricant therebetween; and the fourth plurality of spherical balls being disposed between a seventh seal and an eighth seal, the seventh seal and the eighth seal sealing a fourth lubricant therebetween.

5. The cam follower of claim 3, wherein the first seal is fixed to the first outer ring, the third seal is fixed to the second outer ring, the fifth seal is fixed to the third outer ring, and the seventh seal is fixed to the fourth outer ring.

6. The cam follower of claim 3, wherein the second seal is fixed to the first outer ring, the fourth seal is fixed to the second outer ring, the sixth seal is fixed to the third outer ring, and eighth seal is fixed to the fourth outer ring.

7. The cam follower of claim 3, wherein the first inner ring, the second inner ring, the spacer, the third inner ring, and the fourth inner ring define an axial stackup.

\* \* \* \* \*